United States Patent [19]

Guedry

[11] Patent Number: 5,184,839
[45] Date of Patent: Feb. 9, 1993

[54] SPEEDY HITCH KIT

[76] Inventor: Harry R. Guedry, 3913 Augusta St., Metairie, La. 70001

[21] Appl. No.: 690,307

[22] Filed: Apr. 24, 1991

[51] Int. Cl.⁵ .................................................. B60D 1/06
[52] U.S. Cl. .................................. 280/475; 280/763.1
[58] Field of Search ................... 280/475, 763.1, 414.5, 280/477, 478.1, 492, 457, 459

[56] References Cited

U.S. PATENT DOCUMENTS

| 2,474,296 | 6/1949 | Wiltsee | 280/492 X |
|---|---|---|---|
| 3,084,953 | 4/1963 | McGregor | 280/477 X |
| 3,649,046 | 3/1972 | Mathisen | 280/406.2 |
| 3,765,703 | 10/1973 | Voelkerding et al. | 280/477 |
| 4,057,266 | 11/1977 | Duncan et al. | 280/477 X |
| 4,560,184 | 12/1985 | Williams, Jr. | 280/477 X |
| 4,613,149 | 9/1986 | Williams, Jr. | 280/477 X |
| 4,903,977 | 2/1990 | Baxter | 280/475 |
| 5,054,805 | 10/1991 | Hungerink et al. | 280/475 |

FOREIGN PATENT DOCUMENTS 2233617 1/1991 United Kingdom ............. 280/763.1

Primary Examiner—H. Grant Skaggs
Assistant Examiner—Carol Lynn Druzbick

[57] ABSTRACT

An integrated group of mechanical aids and a method related to the coupling and the uncoupling of a towed vehicle of the well-known tongue-loaded, weight-transfer type, which aids and method permit the uncoupling of the towed vehicle from a prime mover while allowing all components of the coupling assembly to remain in place and attached to the towed vehicle all positioned for subsequent recoupling.

1 Claim, 3 Drawing Sheets

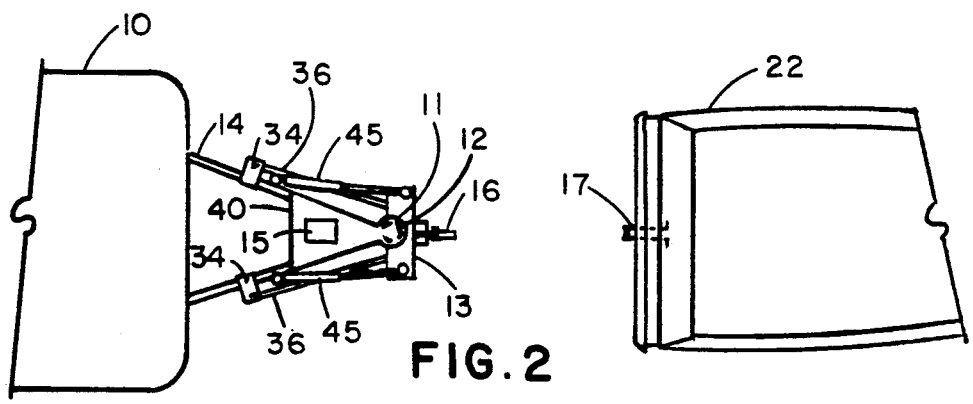
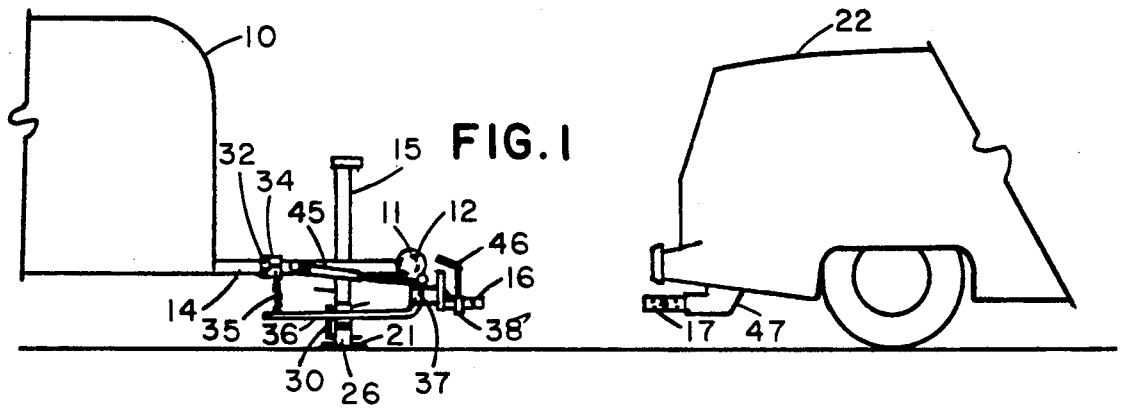
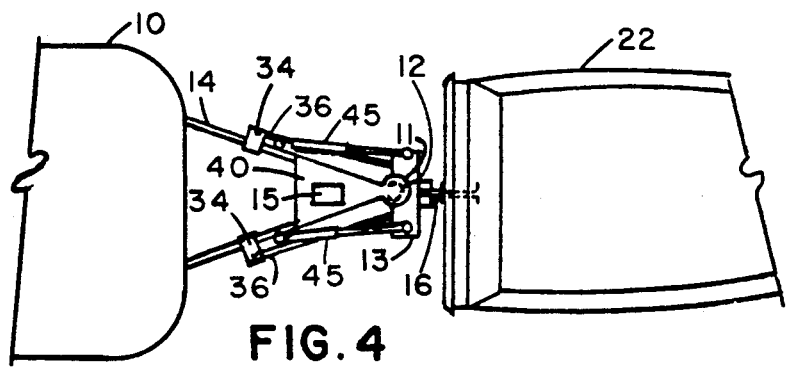
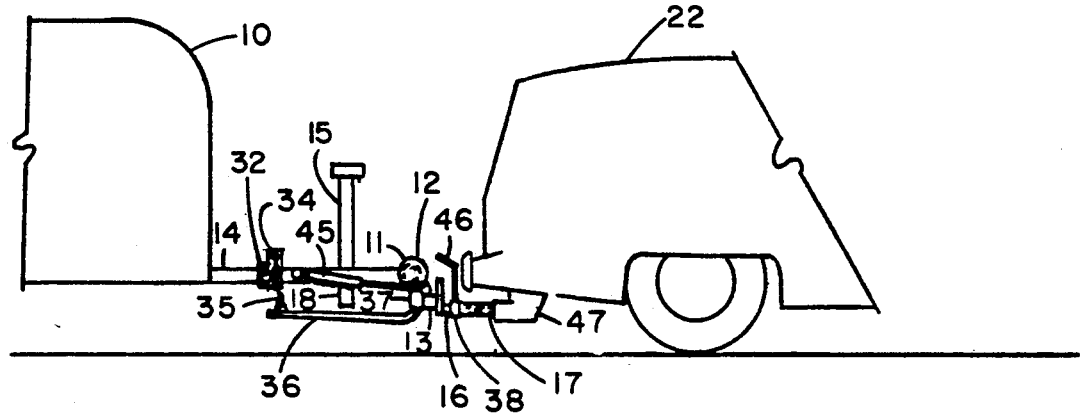

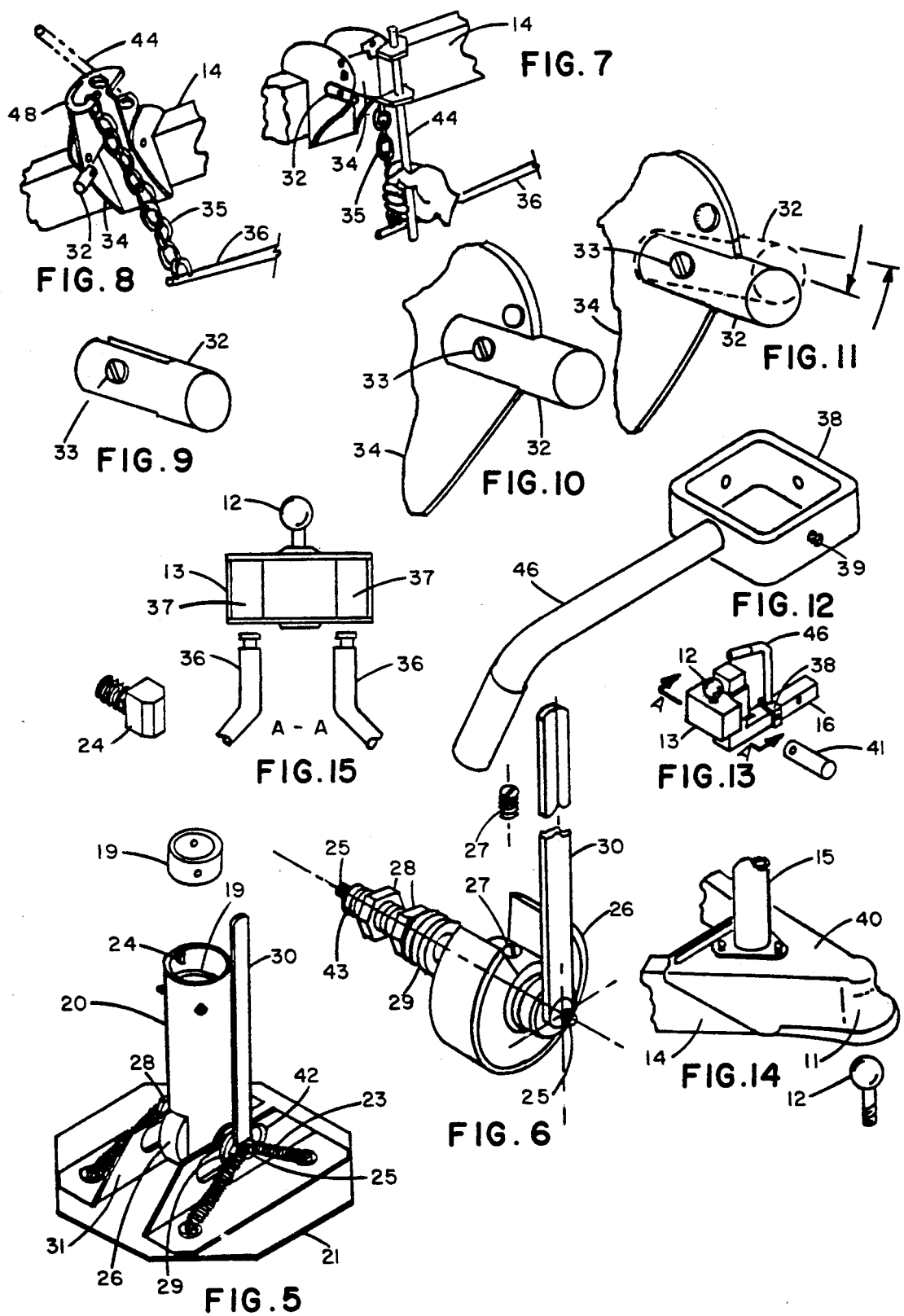

SPEEDY HITCH KIT

BACKGROUND OF THE INVENTION

As will be recognized by those persons regularly involved in the operations that attend the joining and disjoining of towed vehicles from the associated towing vehicle, each operation (both the joining and the disjoining) is fraught with difficulties among which are alignment, both horizontal and lateral, of the hitch components of towed and towing vehicles.

Vehicle towing is commonly practiced by boating persons who move their craft on land using wheeled vehicles; farming persons who move implements, horse and cattle trailers; traveling motorists moving recreational vehicles, and often a second wheeled passenger vehicle.

Whatever is hitched to be towed is at some subsequent time required to be unhitched and, for example, in the case of a towed recreational vehicle (boat, travel trailer, horse and cattle van and the like), the unhitching will likely be required one or more times during a day.

Regular unhitching of the towed vehicles is a routinely required operation when the towing vehicle must perform duties in addition to that of towing.

Accordingly, the following sections will describe briefly some of the required operations that must be performed by a person hitching and unhitching a towed vehicle using the well-known conventional tongue-load, weight-transfer EAZ-LIFT-type hitch that is widely used for light- and medium-weight towed vehicles such as boat, recreational vehicle, animal and vehicle trailers.

Most travel trailer hitch assemblies are designed to distribute the tongue weight of the travel trailer to both the front and rear axles of the tow vehicle. This is accomplished by the use of two spring bars. One end of each bar is attached to the hitch and the other end is attached to the trailer chassis by means of a chain and tension device.

As tension is applied to the chain, some weight of the trailer is applied to the front axle of the tow vehicle. This also keeps the hitch ball tight in the ball socket.

Each time, when hitching or unhitching, it is necessary to install or remove the following hitch parts: the hitch, shank and ball (approximately 50 pounds); two spring bars with chains (approximately 14 pounds each); and two sway controls (approximately 8 pounds each).

The current method to hitch up the towed vehicle to the towing vehicle is to pick up the heavy hitch assembly (approximately 50 pounds) and push the shank of the assembly into the receiver of the tow vehicle, being careful not to get grease on your hands or clothing, making sure to align the holes in the receiver and the shank; install the pin through the hole in the receiver and shank. Next, back up the tow vehicle until the ball of the hitch is directly under the ball socket of the trailer; lower the trailer, using the trailer jack, until the ball enters the socket. Next, activate the latch, locking the ball in the socket. Jack up the trailer to the full height of the trailer jack and then attach the spring bars by lifting one end of each bar and pushing it up into the socket in the hitch assembly. Each bar (with chain) weighs approximately 14 pounds. Lift the chain (attached to the end of the bar) and attach the chain to the hook on the tension device. Using the hook-up handle, flip the handle over top center of the tension device, putting tension into the spring bars. Install sway controls bars (approximately 10 pounds each). Adjust the sway controls bars. Raise the jack and remove the jack stand. To unhitch, it will be necessary to reverse the hitching procedure.

SUMMARY OF THE INVENTION

The main purposes of this invention are: (1) to eliminate many of the operations that are now necessary in the hitching and unhitching of travel trailers and other types of trailers to and from the towing vehicle; (2) to save time and labor; (3) to prevent contamination of the greased parts by dust, sand, grass, moisture, etc.; and (4) to help prevent soiling of clothing while handling the hitch parts.

The Speedy Hitch Kit is comprised of several parts and can be attached to existing and future trailer hitching systems which couple a trailer to a towing vehicle, resulting in saving time, physical effort, storage space and providing a means for keeping the lubricated, movable parts of the whole hitching system clean.

When unhitching, the Speedy Hitch Kit saves time and physical effort by making it unnecessary to remove the following parts of the hitching system: two spring bars, two sway controls bars, and the heavy ball and hitch assembly; and because these parts were not removed, it will not be necessary to replace them when hitching. Presently, without the Speedy Hitch Kit, it is necessary to remove these parts in order to unhitch, and to replace them when hitching.

DESCRIPTION OF THE DRAWINGS

FIG. 1 is an elevation view of an unhitched travel trailer 10 and tow vehicle 22 with the Speedy Hitch Kit installed.

FIG. 2 is a plan view of an unhitched travel trailer 10 and two vehicle 22 with the Speedy Hitch Kit installed.

FIG. 3 is an elevation view of a hitched travel trailer 10 and tow vehicle 22 with the Speedy Hitch Kit installed.

FIG. 4 is a plan view of a hitched travel trailer 10 and tow vehicle 22 with the Speedy Hitch Kit installed.

FIG. 5 is an isometric drawing of the base-plate assembly.

FIG. 6 is an enlarged isometric drawing of the rotable wheel 26 and axle 43 (wheel axle unit) with attached lever 30, nuts 28, flat washers 29, and spring screws 25.

FIG. 7 is an isometric drawing of the adjustable shank attitude device 32 installed on the stationary vertical member of the tension device 34, in the relaxed position with no tension in the spring bar 36.

FIG. 8 is an isometric drawing of the adjustable shank attitude device 32 installed on the stationary vertical member of the tension device 34, in the lifted position with tension in the spring bar 36.

FIG. 9 is an isometric drawing of the adjustable shank attitude device 32.

FIG. 10 is an isometric drawing of the adjustable shank attitude device 32, installed on a segment of the tension device 34.

FIG. 11 is an isometric drawing showing the range of adjustments of the adjustable shank attitude device 32.

FIG. 12 is an isometric drawing of the adjustable shank sleeve 38 with attached leverage bar 46.

FIG. 13 is an isometric drawing of the trailer hitch 13 with the adjustable shank sleeve 38 with attached leverage bar 46 installed on the hitch shank 16. FIG. 13 also shows section marks A—A.

FIG. 14 is an isometric drawing of the trailer tongue with ball 12 and socket 11, and tow bar structure 40.

FIG. 15 is a section view "A—A" taken from FIG. 13, with spring bars 36 added, ready to be pushed up into the sockets 37 of the hitch 13.

DESCRIPTION OF THE INVENTION

Figure 16:
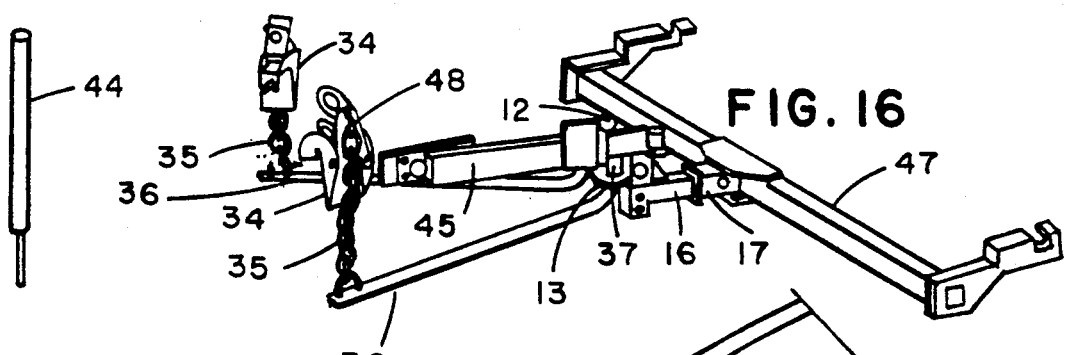
FIG. 16 is an isometric drawing of the complete, uninstalled EAZ-LIFT-type hitch 13, the receiver 17, the sway control 45, the handle 44, the chain hook 48, and the support structure 47. All of the parts shown are standard EAZ-LIFT products.
Figure 17:
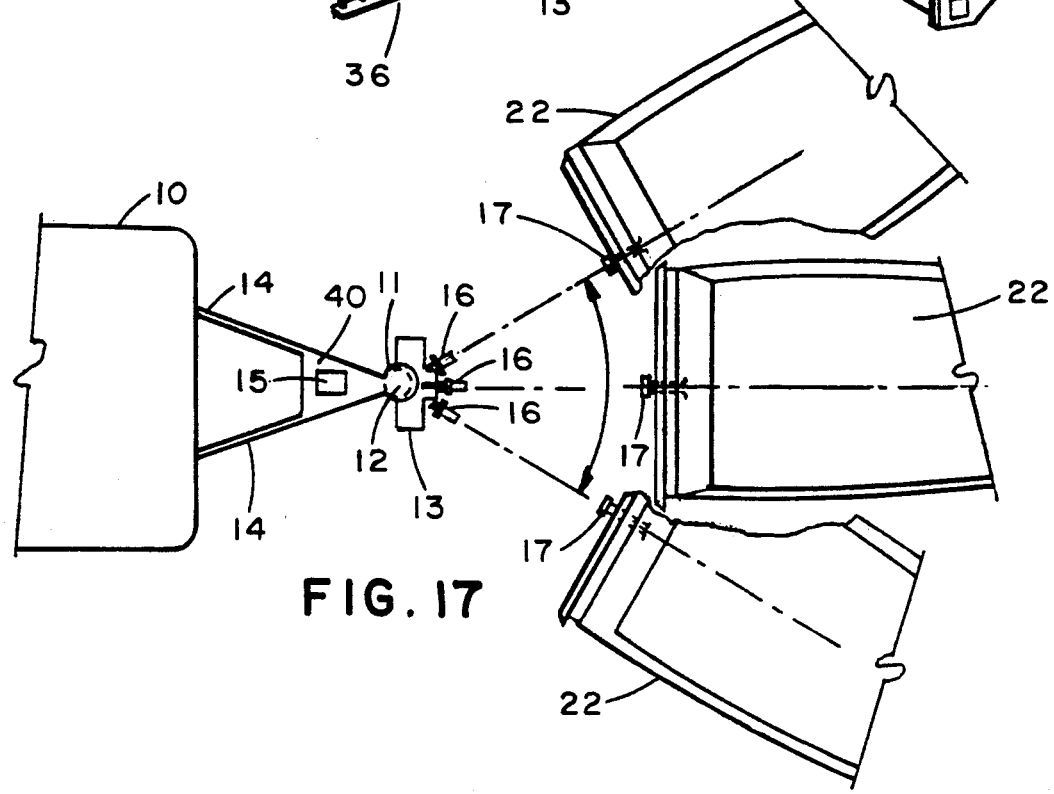
FIG. 17 is a plan view showing the range of lateral swing in which the tow vehicle 22 can be hitched or unhitched to or from the trailer 10. The pivot point is where the ball 12 is in the socket 11.
Figure 18:
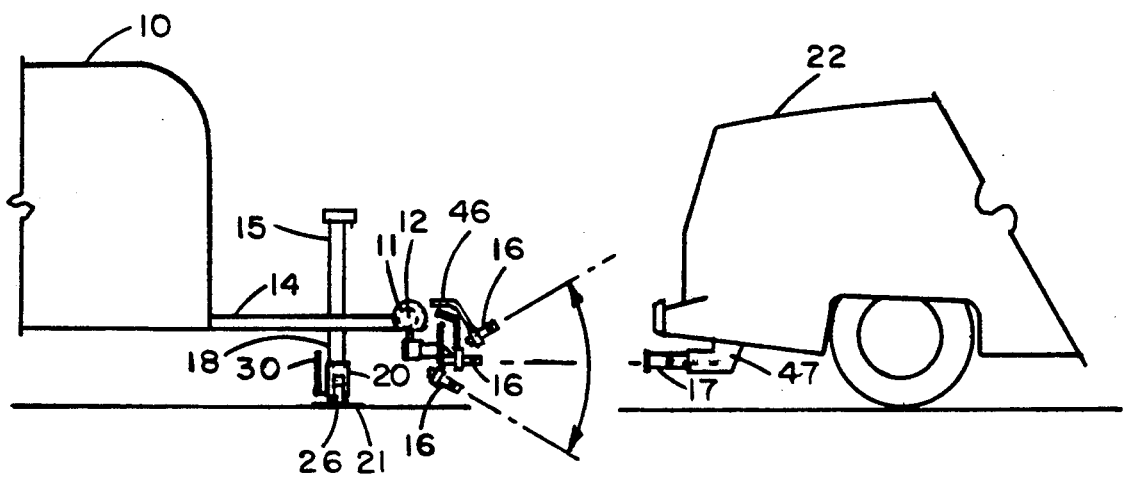
FIG. 18 is an elevation view showing the tilting range that is possible in the vertical plane by use of the leverage bar 46.

To properly describe this invention, it must be noted that the Speedy Hitch Kit is made up of the following:

FIG. 5, the base plate assembly;

FIG. 12, the adjustable shank sleeve with attached leverage bar;

FIG. 9, a pair of adjustable shank attitude device.

The above invention will be installed as follows:

1. The trailer 10 will be parked with wheels chocked.
2. The base-plate assembly FIG. 5 will rest on the ground under the trailer jack, with the tongue weight of the trailer bearing down on the base-plate assembly FIG. 5.
3. The adjustable shank sleeve with attached leverage bar FIG. 12 will be attached to the shank of the hitch as shown in FIG. 13.

4. One of the adjustable shank attitude devices 32 will be installed on each tension device 34 as shown in FIG. 7. A tension device 34 is located on each side of the trailer frame 14 as shown in FIG. 4. FIG. 11 shows the range of adjustment of the adjustable shank attitude devices 32, to raise or lower the spring bars 36 when they are in the resting position as shown in FIGS. 1 and 7. The adjustable shank attitude devices 32 made of a section of rigid material, will be held in place by means of the set screws 33. See FIG. 9. When the adjustable shank attitude devices 32 are adjusted properly, the shank 16 of the trailer hitch 13 will extend outward from the trailer 10 in the correct attitude for alignment with the receiver of the tow vehicle 22 as shown in FIG. 1. FIG. 7 shows the movable part of the tension device 34 resting on the adjustable shank attitude device 32.

5. One end of each spring bar 36 will be pushed up into the sockets 37 of the hitch 13. See FIGS. 15 and 16.
6. The chains 35 will be attached to the hooks 48 of the tension devices 34. See FIG. 8.
7. The ball 12 of the hitch 13 will be installed and locked in the socket 11 of the tow bar structure 40. See FIGS. 13 and 14.

With all of the above installed and adjusted properly, the shank 16 of the hitch 13 will extend forward at an angle approximately parallel to the ground and pointing in the direction of the tow vehicle 22. See FIG. 1.

The trailer 10 is equipped with a tow-bar structure 40 attached to the frame 14, projecting in a forward direction and having a socket 11 designed to accommodate a hitch ball 12 which is attached to the standard trailer hitch 13. The trailer 10 is also equipped with a manual or power jack 15 which is used to raise or lower the front end of the trailer 10 for leveling. This same jack 15, when used with the various parts of this invention installed, will be used to raise or lower the hitch shank 16 in order to horizontally align the shank 16 of the hitch 13 with the receiver 17 of the tow vehicle 22. The jack post 18 of trailer jack 15 rests on the inner ring 19 of the elongated member 20 of the base-plate assembly FIG. 5.

The base-plate assembly FIGS. 5 and 6 consists of the following parts:

1. The base plate 21
2. Slotted vertical walls 31
3. Springs 23
4. Lever 30
5. Screws 25
6. Wheel 26
7. Elongated member 20
8. Set screw 27
9. Nuts 28
10. Washers 29
11. Guide 24
12. Axle 43
13. Inner ring 19

The function of the guide 24 is fit into the groove in the jack post 18, thereby orienting the base-plate assembly FIG. 5 in the correct direction.

The function of the four springs 23 is to automatically return the wheel 26 to the center of the base-plate assembly FIG. 5 when the elongated member 20 and the lever 30 are held in an upright position while placing the base-plate assembly FIG. 5 under the jack post 18 during hitching.

When the tongue weight of the trailer 10 bears down on the base-plate assembly FIG. 5, it is possible with the use of the lever 30, which turns the wheel 26, to move the trailer in a lateral direction, either right or left, making it possible to line up the shank 16 of the hitch 13 with the receiver 17 of the tow vehicle 22 in a lateral way. This travel is limited by the length of the slots 42 in the vertical walls 31 of the base-plate assembly as shown in FIG. 5 each slot 42 supports one of two ends of the axle 43 of the wheel-axle unit.

By using the jack 15, the trailer 10 can be raised or lowered to line up the shank 16 with the receiver 17 of the tow vehicle 22 in a horizontal way.

By using the lever 30 of the base-plate assembly FIG. 5, the trailer 10 can be moved in a lateral way, causing the shank 16 to line up with the receiver 17 of the tow vehicle 22.

In no way will any part of the Speedy Hitch Kit be used during travel.

One feature of this invention is to make it possible to hitch or unhitch without removing the hitch 13, two spring bars 36, and the sway bars 45 (when sway controls 45 are used). It will not be necessary to install any hitch parts before hitching, because they were not removed when the unhitching was done.

Hitching Instructions:

1. Check to be sure the trailer wheel chock is in place.
2. Back up the tow vehicle 22 in the direction of the trailer 10, aligning the hitch shank 16 and the tow vehicle receiver 17 as closely as possible.
3. Using the trailer jack 15, raise or lower the shank 16 until the shank 16 and the receiver 17 are aligned.

4. Using the adjustable shank sleeve 38 with leverage bar 46 attached, adjust the angle of the shank 16 to meet the receiver 17.

5. Back up the tow vehicle 22 until the shank 16 barely enters the receiver 17. At this point, check to see whether the shank 16 is properly aligned for further entry. Lateral adjustment can be made by use of the lever 30 of the base-plate assembly.

6. Rock the leverage bar 46 to detect whether the shank 16 is loose in the receiver 17. When the shank 16 is loose, proceed to back the tow vehicle 22 until the receiver 17 touches the sleeve 38 on the shank 16. If binding occurs, readjust alignment using the jack 15 and the lever 30.

7. Install the pin 41 through the holes in the receiver 17 and the shank 16.

8. Using the jack 15, raise the trailer 10 to a high position.

9. Using the hook-up handle 44 (furnished with the EAZ-LIFT hitch), flip the handle 44 up and over top center of the tension device 34 on both sides of the trailer. See FIG. 8.

10. Adjust the sway controls bars 45.

11. Lower the trailer 10 and remove the base-plate assembly.

12. Store the base-plate assembly in the tow vehicle 22. The hitching is now complete.

Unhitching Instructions:

1. Be sure the trailer wheel chock is in place.

2. Loosen the adjustment on the sway controls bars 45.

3. Place the base-plate assembly FIG. 5 under the jack post 18, aligning the guide 24 of the base-plate assembly FIG. 5 with the groove in the jack post 18.

4. Lower the jack post into the elongated member 20 of the base-plate assembly FIG. 5.

5. Raise the trailer to a high position by use of the trailer jack 15.

6. Lower the two spring bars 36 until the tension devices 34 rest on the adjustable shank attitude devices 32. See FIG. 7.

7. Lower the trailer by using the jack 15 until the ball 12 becomes loose in the socket 11, and stop lowering it before the weight of the trailer bears down on the ball 12 of the trailer hitch 13. This looseness can be detected by rocking the leverage bar 46. See FIG. 12.

8. Remove the pin 41 from the receiver 17.

9. Drive the tow vehicle 22 forward until the shank 16 of the trailer hitch 13 pulls out of the receiver 17. The trailer 10 is now unhitched from the tow vehicle 22.

I claim:

1. A detachable base-plate assembly providing a means for support to the tongue of a towed vehicle of a tongue-loaded, weight-transfer type during standing, coupling, and uncoupling operations, said base-plate assembly comprising:

a base plate defining a generally flat ground-contactable undersurface and an upper surface;

a pair of rail-like projections disposed directionally parallel each to the other across and normal the base plate upper surface, said pair providing a pathway across the base plate upper surface for a rotatable wheel mounted on an axle of a wheel-axle unit, the paired rail-like projections extending normally from the base plate upper surface and each rail-like projection including a longitudinal slot for limiting movement of one of the two ends of said axle;

an elongated member for bridging a space intervening the base plate upper surface and a tongue jack of the towed vehicle, the axle unit being yoke-linked via said axle to said elongated member, the lower end of said elongated member being proximal the upper surface of the base plate, the upper end of the elongated member being distal to the base plate upper surface such that said upper end can be selectively positioned to detachably mate with the towed vehicle tongue jack;

elastic travel restraints for the wheel-axle unit, comprising two matched pairs of juxtaposed counteracting elastic members, each elastic member secured at one end to the wheel-axle unit, the other end of each elastic member secured to the upper surface of the base plate, the pairs balanced tensionally to maintain a normally central position for the wheel-axle unit and elongated member on the upper surface of the base plate;

and a lever proximal the wheel-axle unit providing a means for manually rotating the wheel and axle unit.

* * * * *